FIG. IA

INVENTOR.
CHARLES A. COOK

March 26, 1957     C. A. COOK     2,786,368
TRANSMISSION CONTROL SYSTEM Filed July 29, 1952     10 Sheets-Sheet 3

FIG. IC

INVENTOR.
CHARLES A. COOK
BY
Brown, Jackson, Boettcher & Diemer
ATTYS.

March 26, 1957  C. A. COOK  2,786,368
TRANSMISSION CONTROL SYSTEM
Filed July 29, 1952  10 Sheets-Sheet 4

FIG. 2

INVENTOR.
CHARLES A. COOK
BY
Brown, Jackson, Boettcher & Dienner
ATTYS.

FIG. 3

INVENTOR.
CHARLES A. COOK
BY
Brown, Jackson, Boettcher & Dienner
ATTYS.

INVENTOR.
CHARLES A. COOK

INVENTOR.
CHARLES A. COOK

March 26, 1957  C. A. COOK  2,786,368
TRANSMISSION CONTROL SYSTEM
Filed July 29, 1952  10 Sheets-Sheet 8

FIG. 9

INVENTOR.
CHARLES A. COOK
BY
Brown, Jackson, Boettcher & Dienner
ATTYS.

March 26, 1957 C. A. COOK 2,786,368
TRANSMISSION CONTROL SYSTEM
Filed July 29, 1952 10 Sheets-Sheet 10

FIG. 11

INVENTOR.
CHARLES A. COOK
BY
Brown, Jackson, Bettcher & Diemer
ATTYS.

United States Patent Office 2,786,368
Patented Mar. 26, 1957

2,786,368

TRANSMISSION CONTROL SYSTEM

Charles A. Cook, Jackson, Mich., assignor to Clark Equipment Company, Buchanan, Mich., a corporation of Michigan Application July 29, 1952, Serial No. 301,585

12 Claims. (Cl. 74—732)

My present invention relates generally to transmissions, and, more specifically, is directed to a transmission control system.

One form of transmission with which the control system of my present invention may be embodied comprises an input shaft having a first gear meshing with second and third gears journaled respectively on first and second countershafts. Fourth and fifth gears are secured respectively to the first and second countershafts and have meshing engagement with each other. The transmission further comprises an output shaft having a sixth gear secured thereto which meshes with the fourth gear. First and second fluid actuated clutch means are associated respectively with the second and third gears and when selectively actuated establish forward or reverse drive between the input and output shafts.

It is an object of my present invention to provide control means for a transmission of the above noted character whereby fluid under pressure may be selectively directed to either the first or second clutch means for effecting actuation thereof.

In the accomplishment of the above object, first fluid passageway means is provided between a source of fluid under pressure and a control valve mounted in a sump tank. Second and third fluid passageway means are provided between the control valve and the first and second clutch means. The control valve in one position places the second and third fluid passageway means in communication with the sump tank. The control valve in a second position places the first and second fluid passageway means in communication and places the third fluid passageway means and the sump tank in communication. In still a third position of the control valve, the first and third fluid passageway means are placed in communication and the second fluid passageway means and the sump tank are placed in communication. Thus, either one or none of the clutch means may be actuated.

In the specific embodiment of transmission to be described in detail hereinafter, a three speed manually shiftable gear box is driven by the aforenoted output shaft. To permit the speed ratios of the gear box to be changed, a manually operable overruling valve is interposed in the first fluid passageway means to permit fluid flow to the control valve to be selectively interrupted whereby the first and second clutches are rendered inoperative and drive between the input and output shafts is interrupted thereby removing the driving force on the gears in the gear box.

The abovedescribed transmission has particular utility in an industrial truck with which loads are engaged, transported and deposited. When loads are being raised or lowered, the prime mover of the truck must be operated. Moreover, it frequently becomes necessary to "inch" the truck forwardly or rearwardly as a load is being engaged and raised or lowered. Conventionally, the vehicle transmission is kept in gear and the brakes are employed to control "inching" of the vehicle. This method of control is undesirable because it requires considerable pressure to be applied to the brake pedal by the operator of the vehicle and also causes severe wear of the brake linings.

In a modified form of control system of my present invention, I interpose an overruling valve in the first fluid passageway means, which valve has connection with the fluid circuit of the vehicle brakes. Now, when the brakes are actuated, fluid in the brake circuit acts on the overruling valve to shift the latter to a position interrupting fluid flow to the control valve and effecting bleeding of the clutch means thus rendering the latter inoperative. When the brake pedal is released, the overruling valve is returned to its normal position reestablishing communication between the control valve and the source of fluid under pressure. As a result of the above construction, drive between the input and output shafts may be interrupted and reestablished quickly and positively to permit "inching" of the vehicle without interfering with the operations of raising and lowering a load.

The control system of my present invention is further operative to control the flow of fluid under pressure to a torque converter interposed between the vehicle prime mover and the transmission input shaft. A first check valve having a relatively high pressure setting is disposed between the torque converter and the source of fluid under pressure. A second check valve having a relatively low pressure setting is disposed between the torque converter and the sump tank of the fluid circuit for returning fluid passing through the torque converter to the sump tank. In addition, a third check valve having an intermediate pressure setting is interposed between the first check valve and the sump tank for by-passing a portion of the fluid, flowing through the first check valve, around the torque converter. The three check valves are operatively related to maintain the pressure of the fluid flowing to the torque converter within the proper range for efficient operation.

Now, in order to acquaint those skilled in the art with the manner of constructing and using transmission control systems in accordance with the principles of my present invention, I shall describe in connection with the accompanying drawings, preferred embodiments of my present invention.

Figure 1A:
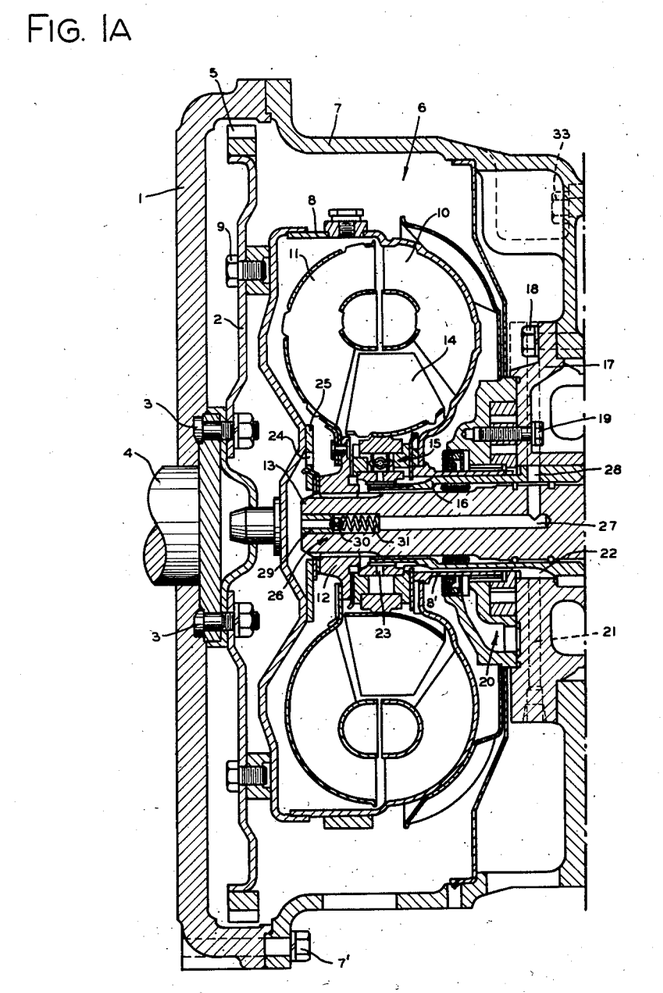
Figures 1A, 1B and 1C when laid side by side show a vertical longitudinal sectional view of a transmission with which the control system of my present invention may be embodied.

Referring now to the drawings, there is indicated at 1 an engine flywheel housing, which encloses a flywheel 2 secured by bolts 3 to the end of an engine or prime mover crankshaft 4. Suitably secured, as by welding, to the outer periphery of the flywheel 2 is an external ring gear 5, which is adapted to be selectively driven by a conventional starter motor.

Located rearwardly of the engine flywheel 2 is a fluid torque converter unit, indicated generally by the reference numeral 6, which is located within a housing 7 secured by bolts 7' to the flywheel housing 1. The fluid torque converter unit 6 comprises a pump housing 8 which is secured, by bolts 9, to the flywheel 2 for rotation therewith. The pump housing 8 includes a hub portion 8' and elements 10. The fluid torque converter unit 6 further comprises turbine elements 11 mounted to a hub member 12 which is keyed to the forward end of an axially rearwardly extending horizontal transmission input shaft 13. The torque converter unit 6 still further comprises reaction elements 14, which are mounted, through a one way brake, indicated generally by the reference numeral 15, on a sleeve member 16 disposed concentrically about the input shaft 13 and secured at its rear end to a flange member 17 secured by bolts 18 to the torque converter housing 7. The stationary sleeve member 16 serves to support the hub portion 8' of the pump housing 8.

Mounted concentrically about the stationary sleeve member 16 and secured to the flange member 17 by means of bolts 19 is a fluid pump assembly, indicated generally by the reference numeral 20. The pump 20 provides a source of fluid under pressure for use in the control system of my present invention which will be described more fully hereinafter.

Fluid under pressure for use in the torque converter unit 6, is admitted through a radial fluid passageway 21, formed in the flange member 17, an axial fluid passageway 22 formed in the stationary sleeve member 16, a port 23, formed in the one way brake 15 and, hence, is directed to the pump and turbine elements 10 and 11. Fluid flows from the torque converter unit 6 through a port 24 formed in a bracket member 25 arranged concentrically about the input shaft 13 and suitably secured, as by welding, to the pump housing 8. From the port 24 the fluid is directed through a check valve, indicated generally by the reference numeral 26 into a fluid passageway 27 formed in the input shaft 13. The fluid passageway 27 communicates with a fluid passageway 28 formed in the stationary sleeve member 16 and the flange member 17. The aforedescribed check valve 26 comprises a sleeve member 29, fitted in the passageway 27, against the one end of which a ball 30 is normally biased by means of a spring 31. The check valve 26 has a relatively low pressure setting which may, for example, be of the order of 20 p. s. i.

The torque converter housing 7, at its rear end, has secured thereto, by bolts 33, a transmission housing 34. The housing 34 is provided with an upper detachable cover member 37 to permit access to be had to the interior thereof.

The afore described transmission input shaft 13 is journaled in a ball bearing assembly 35 retained in the forward end wall of the transmission housing 34. A gear 36 is formed at the end of the transmission input shaft 13, within the transmission housing 34. A pair of countershafts 38 and 39 are disposed within the transmission housing 34 above the axis of the transmission input shaft 13, at opposite sides of a vertical plane passing through the axis of the latter.

Figure 1B:
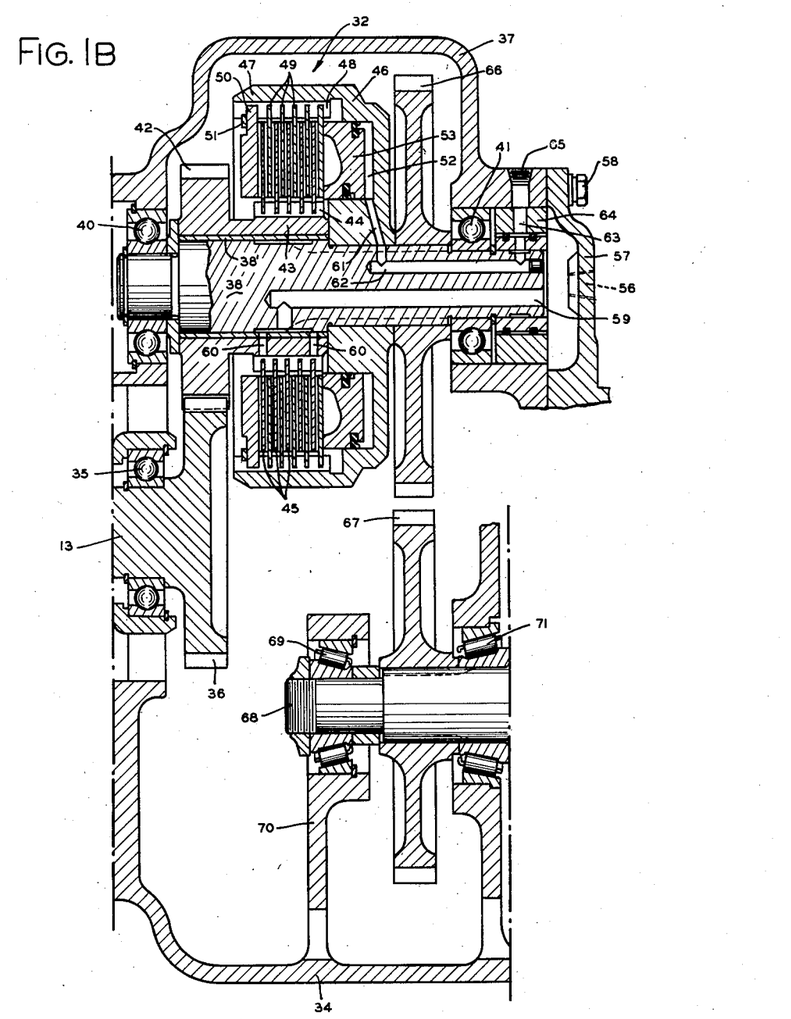

The countershaft 38, for the sake of clarity, is shown revolved out of its normal position in Figure 1B. The countershaft 38 is journaled at its forward end in a ball bearing assembly 40 retained in the forward end wall of the transmission housing 34. The rear end of the countershaft 38 is journaled in a ball bearing assembly 41, retained in the rear end wall of the transmission housing 34. Journaled on a bushing sleeve 38' mounted on the countershaft 38, adjacent the forward end wall of the transmission housing 34, is a gear 42, which has meshing engagement with the gear 36 at the rear end of the transmission input shaft 13.

The gear 42 is adapted to be selectively clutched to the countershaft 38 by means of clutch means indicated generally at 32. The gear 42 includes an axially rearwardly extending tubular hub portion 43, which is formed with external straight splines 44. Mounted for axial movement on the splines 44 are a plurality of annular radially extending clutch discs 45. Secured to the countershaft 38, rearwardly of the hub portion 43 of the gear 42, is a cylinder assembly 46, which includes an axially forwardly extending tubular portion 47. The axially extending tubular portion 47 overlies the clutch discs 45 and is formed with internal straight splines 48, on which are mounted, for axial movement, a plurality of annular radially extending clutch discs 49. The clutch discs 49 are arranged alternately with respect to the clutch discs 45. An annular end plate 50 is slidably mounted on the internal splines 48 and is restrained against movement in one direction by means of a retaining ring 51.

The cylinder assembly 46 includes an annular cylinder portion 52, in which is mounted for axial movement, an annular piston 53. The piston 53 is provided for urging the clutch disc 49 into frictional clutching engagement with the clutch discs 45, so as to clutch gear 42 to the countershaft 38. Actuation of the piston 53 is effected by selectively admitting fluid under pressure into the cylinder 52. The cylinder 52 is adapted to be placed into communication with a source of fluid under pressure through a fluid passageway 61 formed in the cylinder assembly 46, a fluid passageway 62 formed in the countershaft 38, a fluid passageway 63 formed in a fluid distributor hub 64 mounted in the rear end wall of the transmission housing 34, and a fluid passageway 65 formed in the transmission cover 37. An end plate 57 is secured by bolts 58 to the cover member 37 and the transmission housing 34. Oil for cooling the clutch discs 45 and 49 is admitted to the latter through a port 56 formed in the end plate 57, a fluid passageway 59 formed in the countershaft 38, and radial openings 60 in the hub portion 43 of the gear 42 and the associated bushing sleeve 38'.

Figure 2:
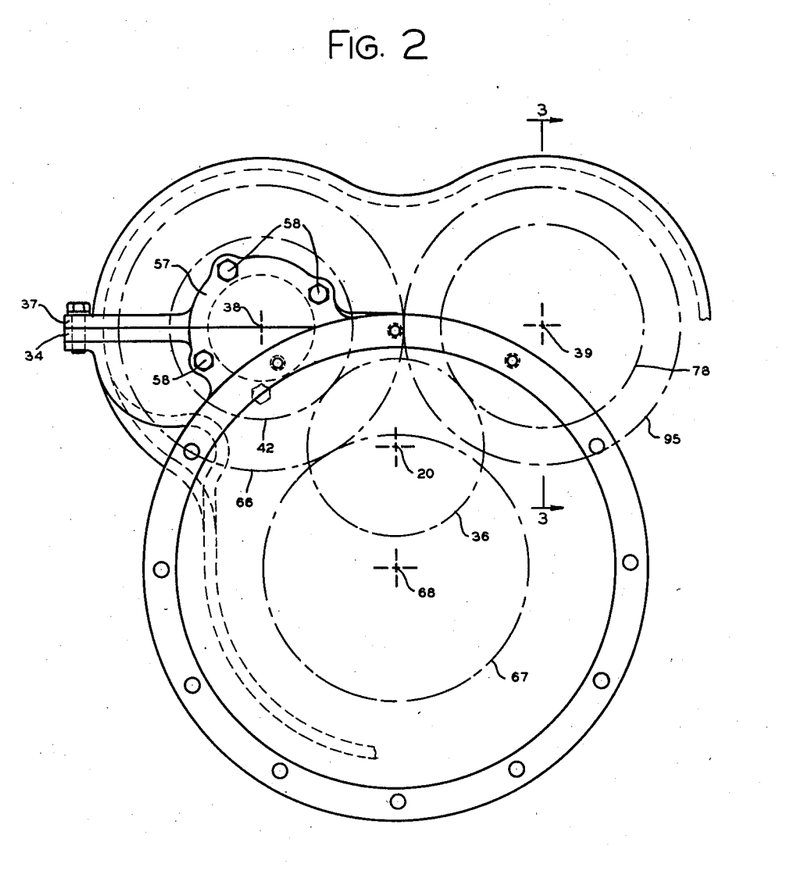
Figure 2 is a generally diagrammatic end elevational view of the transmission of Figure 1, showing the geometric arrangement of the various transmission shafts.

Secured to the countershaft 38, intermediate of the ball bearing assembly 41 and the cylinder assembly 46, is a gear 66. The gear 66 has meshing engagement, as shown in Figure 2, with a gear 67 keyed to an output shaft 68, the axis of which lies below the transmission input shaft 13 in the same vertical plane as the axis of the latter. The output shaft 68, at its forward end, is journaled in a tapered roller bearing assembly 69 retained in a radial wall 70 of the transmission housing 34. The rear end of the output shaft 68 is journaled in a tapered roller bearing assembly 71 retained in the rear end wall of the transmission housing 34.

Figure 3:
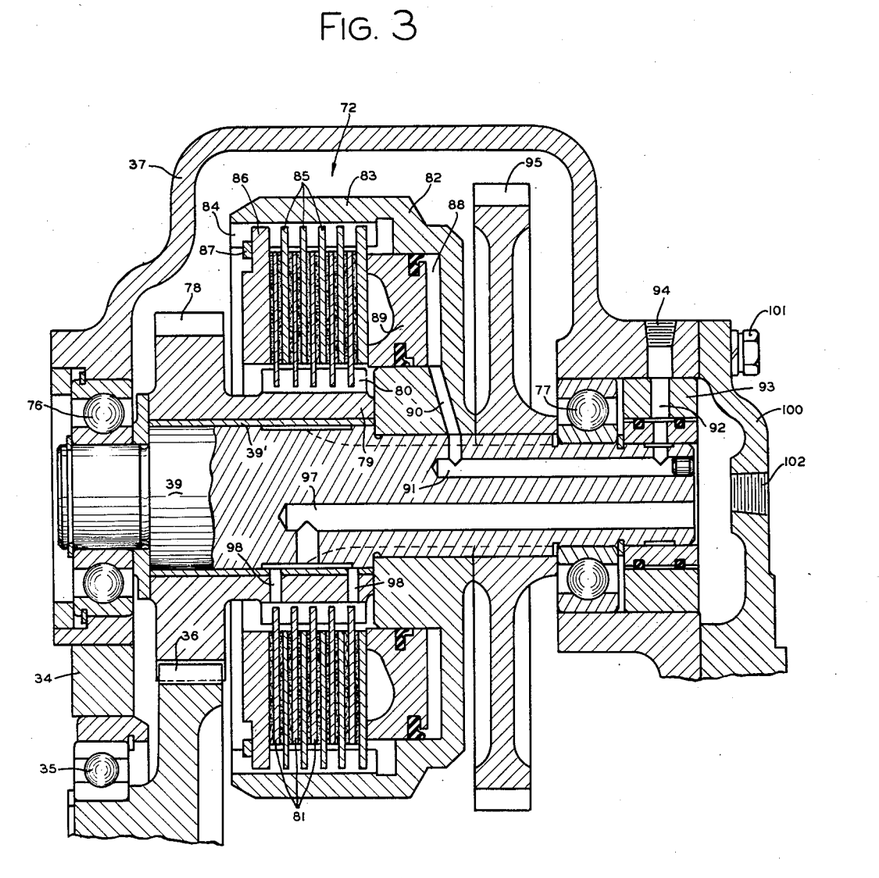
Figure 3 is a partial sectional view taken along the line 3—3 in Figure 2, looking in the direction indicated by the arrows.
Figure 4:
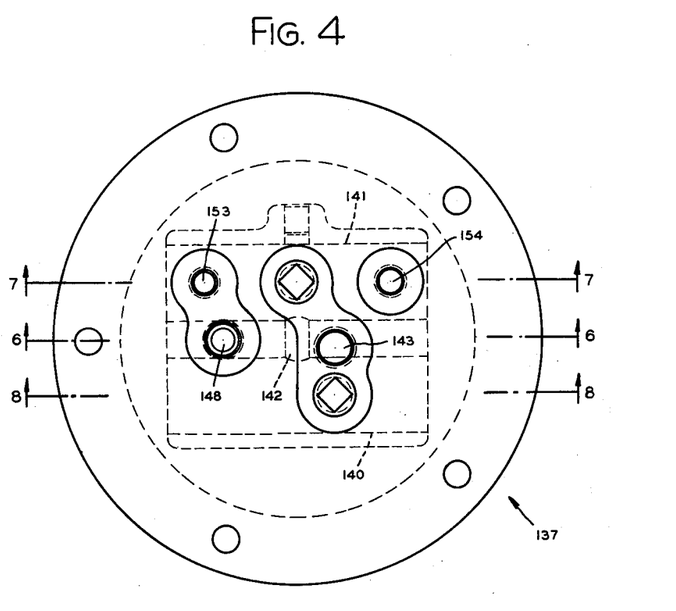
Figure 4 is a plan view of one embodiment of a control valve mechanism of my present invention.
Figure 5:
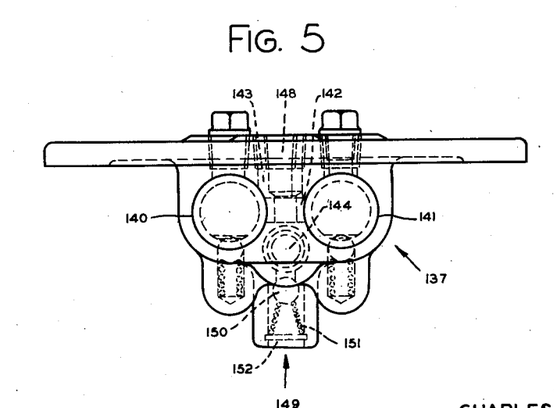
Figure 5 is an end view of the control valve mechanism of Figure 4.
Figure 6:
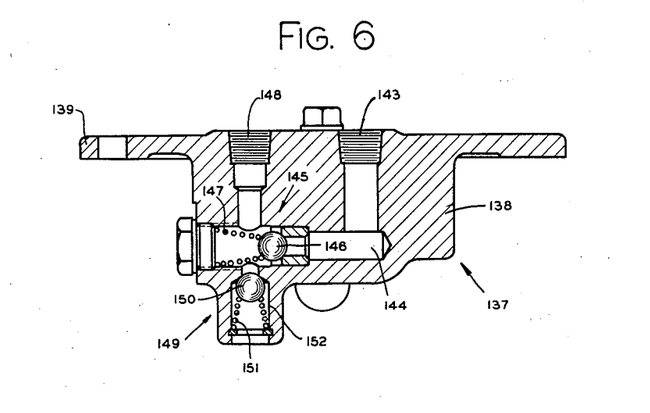
Figure 6 is a sectional view of the control valve mechanism taken along the line 6—6 in Figure 4, looking in the direction indicated by the arrows.
Figure 7:
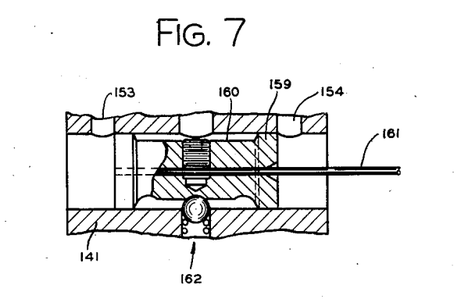
Figure 7 is a sectional view of the control valve mechanism taken along the line 7—7 in Figure 4, looking in the direction indicated by the arrows.

The aforenoted countershaft 39, as shown in Figure 3, is journaled at its forward end in a ball bearing assembly 76, which is retained in the forward end wall of the transmission housing 34. The shaft 39 is journaled at its rear end in a ball bearing assembly 77, retained in the rear end wall of the transmission housing 34. A gear 78 is journaled on a bushing sleeve 39' mounted on the countershaft 39, adjacent the forward end wall of the transmission housing 34, and the gear 78 has meshing engagement with the gear 36 at the rear end of the transmission input shaft 13.

The gear 78 is adapted to be selectively clutched to the countershaft 39 by means of clutch means, indicated generally at 72. The gear 78, like the gear 42 on the countershaft 38, includes an axially rearwardly extending tubular portion 79, having external straight splines 80. Mounted for axial movement on the splines 80 are a plurality of radially extending annular clutch discs 81. Secured to the countershaft 39, rearwardly of the hub 79 of the gear 78, is a cylinder assembly 82, which is formed with an axially forwardly extending tubular portion 83. The tubular portion 83 overlies the clutch discs 81 and is formed with internal straight splines 84, on which are mounted for axial movement, a plurality of annular radially extending clutch discs 85. The clutch discs 85 are arranged alternately with respect to the clutch discs 81. Also mounted for axial movement on the internal straight splines 84 is a clutch plate 86 which is restrained against axial movement in one direction by a retaining ring 87.

An annular cylinder 88 is defined within the cylinder assembly 82, and disposed within the cylinder 88 is an annular piston 89. The piston 89 is provided for urging the clutch discs 85 into frictional clutching engagement with the clutch discs 81, so as to clutch the gear 78 to the countershaft 39. The piston 89 is actuated by the selective admission of fluid under pressure into the cylinder 88. The cylinder 88 is adapted to be placed in communication with a source of fluid under pressure through a fluid passageway 90 formed in the cylinder assembly 82, a fluid passageway 91 formed in the countershaft 39, a fluid passageway 92 formed in a fluid distributor member 93 mounted in the rear end wall of the transmission housing 34, and a fluid passageway 94 formed in the transmission cover 37. An end plate 100 is secured by bolts 101 to the cover member 37 and the transmission housing 34. Oil for cooling the clutch discs 81 and 85 is admitted to the latter through a port 102 formed in the end plate 100, a fluid passageway 97 in the countershaft 39, and radial openings 98 in the hub portion 79 of the gear 78 and the associated bushing sleeve 39'.

Secured to the countershaft 39, intermediate of the ball bearing assembly 77 and the cylinder assembly 82, is a gear 95, which has constant meshing engagement with the aforedescribed gear 66 secured to the countershaft 38.

The operation of the aforedescribed transmission is as follows. When it is desired to drive the output shaft 68 in a forward direction, the gear 42 is clutched to the countershaft 38 by effecting actuation of the clutch means 32. Drive is then effected between the input shaft 13 and the output shaft 68 through the gear 36, gear 42, clutch means 32, countershaft 38, gear 66, and gear 67. When it is desired to drive the output shaft 68 in a reverse direction, the gear 42 is de-clutched from the countershaft 38 and the gear 78 is clutched to the countershaft 39 by simultaneously rendering the clutch means 32 inoperative and effecting actuation of the clutch means 72. Drive is now effected between the input shaft 13 and the output shaft 68 through the gear 36, gear 78, clutch means 72, countershaft 39, gear 95, gear 66, and gear 67.

It is to be observed that the gear 66 on the countershaft 38 serves as a drive gear when the output shaft 68 is driven in a forward direction, and serves as an idler gear when the output shaft 68 is driven in a reverse direction. The utilization of the gear 66 as an idler gear avoids the provision of a relatively small diameter idler gear, which, of necessity, would have to rotate at undesirable high speeds. Those skilled in the art will readily appreciate that torque multiplication between the engine and the output shaft 68, in either forward or reverse drive, is accomplished by the torque converter unit 6.

Figure 1C:
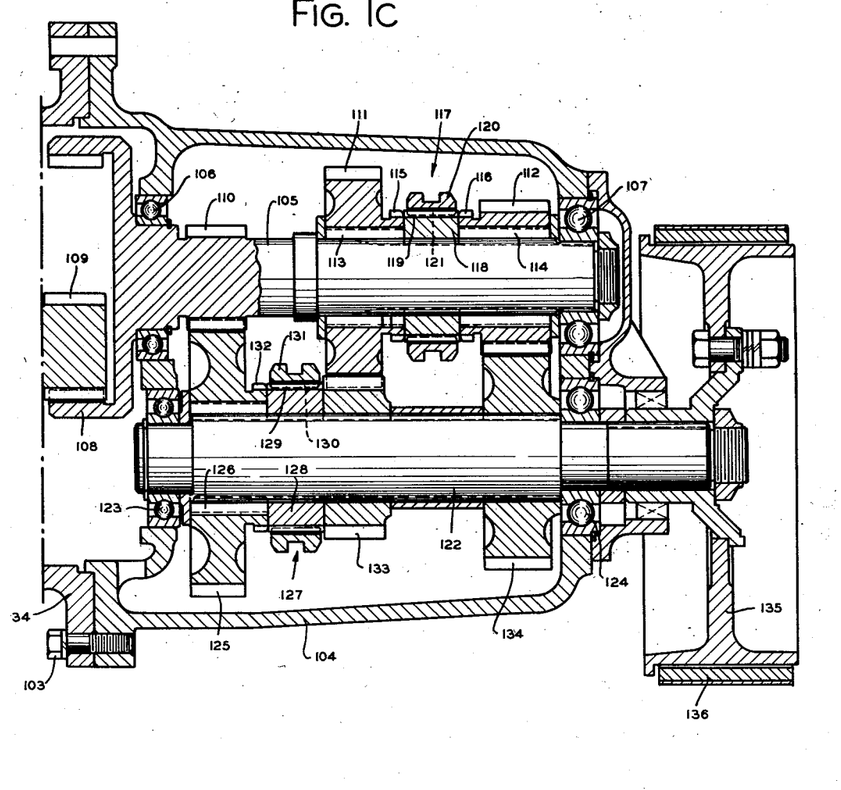

Secured to the rear end of the transmission housing 34, by means of bolts 103, is a change speed gear box 104. Disposed within the gear box housing 104 is a drive shaft 105 which is journaled, at its forward end, in a ball bearing assembly 106 retained in the forward end wall of the housing 104, and, at its rear end, in a ball bearing assembly 107 retained in the rear end wall of the housing 104. Suitably secured to the forward end of the drive shaft 105 is an internal ring gear 108 which has constant meshing engagement with a gear 109 formed at the rear end of the transmission output shaft 68. A gear 110 is preferably formed integrally with the drive shaft 105 adjacent the forward end wall of the housing 104 and a pair of axially spaced gears 111 and 112 are journaled, respectively, on bushing members 113 and 114 mounted concentrically about the shaft 105. The gears 111 and 112 are formed, respectively, with jaw clutch teeth 115 and 116. The gears 111 and 112 are adapted to be selectively clutched to the shaft 105 by means of a manually operable clutch mechanism, indicated generally by the reference numeral 117. The clutch mechanism 117 comprises a hub portion 118 secured to the shaft 105, which hub portion 118 is formed with external straight splines 119 on which is mounted for sliding axial movement, an annular clutch collar member 120 having internal straight splines 121. When the clutch collar member 120 is shifted to the right, the internal splines 121 are disposed in meshing engagement with the jaw clutch teeth 116 of gear 112 for clutching the latter to the shaft 105. When the clutch collar member 120 is shifted to the left, the internal splines 121 are disposed in engagement with the jaw clutch teeth 115 of gear 111 for clutching the latter to the shaft 105.

Disposed within the housing 104 below the drive shaft 105 is a driven shaft 122, which, at its forward end, is journaled in a ball bearing assembly 123 secured in the forward end wall of the housing 104, and, at its rear end, is journaled in a ball bearing assembly 124 secured in the rear end wall of the housing 104. At the forward end of the shaft 122, adjacent the ball bearing assembly 123, a gear 125 is journaled on a bushing member 126 disposed concentrically about the shaft 122. The gear 125 has constant meshing engagement with the gear 110 on shaft 105. Secured to the shaft 122 immediately rearwardly of the gear 125 is a clutch mechanism indicated generally by the reference numeral 127. The clutch mechanism 127 comprises a hub portion 128 secured to the shaft 122, which clutch hub 128 is formed with external straight splines 129 which receive the internal straight splines 130 of a clutch collar member 131. The clutch collar member 131 is adapted to be shifted to the left for disposing the internal splines 130 into engagement with jaw clutch teeth 132 formed on the gear 125 for clutching the latter to the driven shaft 122. Gears 133 and 134 are secured to the driven shaft 122 and have meshing engagement, respectively, with the gears 111 and 112 on the shaft 105.

The driven shaft 122 extends outwardly of the housing 104 and has secured at its rear end a brake drum 135 having a brake band 136 associated therewith whereby braking of the driven shaft 122 may be effected.

For low speed high-ratio drive, the clutch collar member 131 is moved to the left for clutching the gear 125 to the driven shaft 122. For intermediate speed intermediate ratio drive, the clutch collar member 131 is returned to the position shown in Figure 1C and the clutch collar member 120 is moved to the right for clutching the gear 112 to the drive shaft 105. For high speed low-ratio drive, the clutch collar member 117 is moved to the left for clutching the gear 111 to the drive shaft 105. It will thus be seen that three speeds in either direction may be effected between the drive shaft 105 and the driven shaft 122 by the selective actuation of the clutch collar members 120 and 131. The clutch collar members 120 and 131 are adapted to be moved selectively by means of suitable shift forks and linkage means therefor. Since the latter means is conventional and forms no part of my present invention, it is believed unnecessary to show and describe the same in detail.

I shall now describe the details of construction and operation of one embodiment of fluid control circuit of my present invention whereby actuation of the fluid clutches 32 and 72 may be effected and fluid within the proper pressure range is delivered to the fluid torque converter 6.

The control circuit of my present invention includes a control valve mechanism which is shown in detail in Figures 4 through 8. The control valve mechanism is indicated generally by the reference numeral 137 and comprises a valve body or housing 138 which is adapted to be disposed within the change speed gear housing 104 and secured to the same by means of the mounting flange 139. A pair of parallel valve openings 140 and 141 are formed through the valve body 138. The openings 140 and 141 are interconnected by means of a fluid passageway 142. A fluid port 143 is formed in the valve body 138 and opens outwardly thereof at one end and at the other communicates with the valve opening 140 and with a fluid passageway 144 which extends parallel to the openings 140 and 141. Mounted in the fluid passageway 144 is a check valve, indicated generally by the reference numeral 145 having a relatively high pressure setting which may, for example, be of the order of 90 p. s. i. The check valve 145 comprises a ball member 146 and a spring 147. Rearwardly of the check ball 146, the fluid passageway 144 communicates with a fluid port 148 which opens outwardly of the valve body 138. Also arranged rearwardly of the check ball 146 is a check valve, indicated generally by the reference numeral 149, which has an intermediate pressure setting of the order of 40 p. s. i. The check valve 149 comprises a ball 150 and spring 151 and is arranged within a fluid port 152 which opens outwardly of the valve body 138 into the housing 104.

Axially spaced fluid ports 153 and 154, at their one ends, communicate with the valve opening 141 and at their other ends, open outwardly of the valve body 138.

Figure 8:
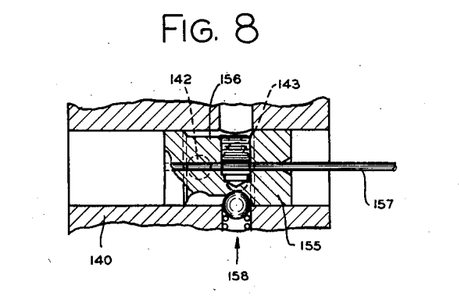
Figure 8 is a sectional view of the control valve mechanism taken along the line 8—8 in Figure 4, looking in the direction indicated by the arrows.

Disposed within the opening 140 is a spool valve 155 which is formed with a central annular groove 156. A suitable Bowden wire 157 is secured within the spool valve 155 and is adapted to have suitable connection with a control lever (not shown) whereby movement of the spool valve 155 within the opening 140 may be selectively effected. The valve 155 has two positions which are positively located by means of locating means indicated generally at 158. The valve 155 in the position shown in Figure 8 is adapted to place fluid port 143 in communication with fluid passageway 142. When the valve 155 is shifted to the right from the position shown in Figure 8, communication between the fluid port 143 and the fluid passageway 142 is interrupted.

A spool valve 159 is disposed in the valve opening 141 and has a central annular groove 160 formed therein. The valve 159 has secured thereto a Bowden wire 161 which is adapted to have suitable connection with a control lever (not shown) for effecting movement of the valve 159 within the opening 141. The valve 159 has three positions which are positively located by means of locating means indicated generally by the reference numeral 162. With the valve 159 in the position shown in Figure 7, fluid flowing into the opening 141, through the fluid passageway 142, is permitted only to flow about the annular groove 160 in the valve 159. It is to be further noted that, since the valve body 138 is disposed within the housing 104, the fluid ports 153 and 154 are in communication with the interior of the housing 104 which serves as a sump tank. If the valve 159 is now shifted to the left from the position shown in Figure 7, the fluid passageway 142 is disposed in communication with the fluid port 153 through the annular groove 160. The fluid port 154 remains in communication with the interior of the housing 104. Now, if the valve 159 is shifted to the right from the position shown in Figure 7, the fluid passageway 142 is placed in communication with the fluid port 154 while the fluid port 153 is returned to communication with the interior of the housing 104.

Figure 9:
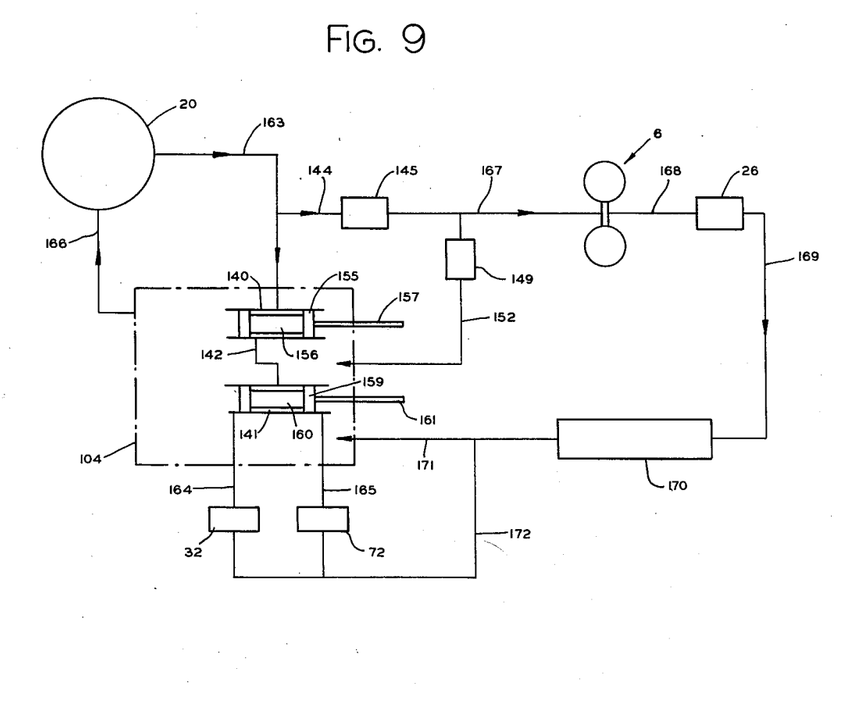
Figure 9 is a diagrammatic showing of one embodiment of fluid control system of my present invention wherein the control valve mechanism of Figure 4 is incorporated.

Referring now to Figure 9, there is shown a diagrammatic layout of the fluid circuit of the control means of my present invention. The aforedescribed fluid port 143 in the valve body 138 is adapted to have connection through a fluid line (not shown) with the discharge side of the fluid pump 20. Thus, fluid under pressure is delivered to the opening 140 in the valve body 138 through fluid passageway means shown diagrammatically at 163. The fluid ports 153 and 154 have suitable connection through fluid lines (not shown) with the fluid passageways 65 and 94 formed in the transmission cover member 37. Thus, the opening 141, as shown diagrammatically in Figure 9, has connection with the clutch means 32 and 72 through fluid passageway means indicated at 164 and 165. The pump 20 is also adapted to have connection through fluid passageway means, indicated at 166 in Figure 9, with the sump tank or housing 104.

With the valves 155 and 159 in the position shown in Figure 9, the clutch means 32 and 72 are placed in communication with the sump tank 104 and, thus, are inoperative. Should it now be desired to effect actuation of the clutch means 32, the control wire 161 is urged to the left from the position shown in Figure 9, thereby moving the valve 159 to the left for placing the fluid passageway 142 in communication with the fluid passageway means 164 leading to the clutch means 32. In this position of the valve 159, it will be noted that the clutch means 72 remains inoperative as it is in communication, through the fluid passageway means 165, with the sump tank 104. Now, if it is desired to effect actuation of the clutch means 72, the valve 159 is shifted to the right from the position shown in Figure 9 thereby placing the fluid passageway means 165 in communication with the fluid passageway 142. Simultaneously, the fluid passageway means 164 leading to the clutch means 32 is placed in communication with the sump tank 104, thereby rendering the clutch means 32 inoperative. From the foregoing description, it will be readily apparent that, by selective movement of the valve 159, either the clutch means 32 or the clutch means 72 may be actuated, or both clutch means may be rendered inoperative.

If either the forward or reverse drive clutch 32 or 72 is actuated, drive is established between the input shaft 13 and the output shaft 68 and a driving load is thereby placed on the drive shaft 105 of the change speed gear means arranged within the housing 104. It is necessary, prior to the shifting of the clutch collar members 120 and 131, during changes in speed ratios, to remove the driving load on the shaft 105. In order to accomplish this quickly and positively, the valve 155 is adapted to be shifted to the right from the position shown in Figure 9 for interrupting communication between the fluid passageway means 163 and the fluid passageway 142 and for placing the latter in communication with the sump tank 104 thereby rendering the selected forward or reverse drive clutch means 32 and 72 inoperative. This interrupts drive between the input shaft 13 and the output shaft 68 of the transmission and removes the driving load on the drive shaft 105 of the change speed gear means. After the desired speed ratio has been selected within the change speed gear means, the valve 155 may be returned to the position shown in Figure 9 for re-establishing communication between the fluid passageway means 163 and the fluid passageway 142.

The control system of my present invention is also operative to control the flow of fluid under pressure to the torque converter 6. When the fluid under pressure admitted to the fluid port 143 and fluid passageway 144, formed in the valve block 138, exceeds a value of 90 p. s. i., the check valve 145 is opened and the fluid flows therepast into the fluid port 148 which has connection through a fluid line (not shown) with the fluid passageway 21 formed in the flange member 17 secured to the rear end wall of the torque converter housing 7. As described in detail hereinbefore, fluid entering the fluid washer 193 for urging the valve member 186, against the force of spring 189, to the left, as viewed in Figure 10. As the valve 186 is moved to the left, communication between the fluid passageway 177 and 178 is interrupted and the fluid passageway 177 is placed in communication, through a fluid port 205, with the sump tank 104 thereby placing the clutch means 32 and 72, which was formally actuated, under bleed conditions for rendering the same inoperative.

Upon release of the brake pedal 200, the pressure on the fluid in the master cylinder 197 is relieved thereby relieving the fluid pressure in the fluid passageways 195 and 196 and also in the valve opening 176. Thereupon, the spring 189 will cause the valve 186 to return to the right to the position shown in Figure 10 for interrupting communication between the fluid port 205 and the fluid passageway 177 and reestablishing communication between the fluid passageways 177 and 178.

From the foregoing description it will be realized that actuation of the clutch means 32 and 72 may be controlled, for "inching" the vehicle, by suitable manipulation of the brake pedal 200.

In the modified embodiment of the control system of my present invention, fluid flowing to the torque converter 6 is also controlled by means of check valves. A check valve 207 having a relatively high pressure setting of the order of 90 p. s. i. has connection through fluid passageway means 208 with the fluid passageway means 196 connected to the discharge side of the pump 10. The check valve 207 also has connection through fluid passageway means 209 with the torque converter 6. Fluid flowing through the torque converter 6 is returned through fluid passageway means 210 and a check valve 211, having a relatively low pressure setting of the order of 20 p. s. i., to fluid passageway means 212 having connection with the sump tank 104. Check valve 213, having an intermediate pressure setting of the order of 40 p. s. i., has connection, through fluid passageway means 214, with the aforenoted fluid passageway means 209 between the check valve 207 and torque converter 6. The check valve 213 has also connection, through fluid passageway means 215, with a cooler 216 wherefrom the fluid is directed, through fluid passageway means 217, to the sump tank 104 and the clutch plates of the clutch means 32 and 72 for effecting cooling of the latter.

It should be noted that the aforedescribed check valves 207, 211 and 213 are operatively related to maintain the pressure of the fluid flowing to the torque converter 6 within the proper range for the efficient operation thereof.

Now, while I have shown and described what I believe to be preferred embodiments of my present invention, it will be understood that various modifications and rearrangements may be made therein without departing from the spirit and scope of my present invention.

I claim:

1. For use in a vehicle having fluid actuated brakes, a fluid circuit for said brakes, a transmission including first and second fluid actuated clutch means, the combination of control means for selectively controlling actuation of the clutch means comprising, a source of fluid under pressure, a first valve, first fluid passageway means between said source of fluid under pressure and said first valve, a second valve, second fluid passageway means between said first and second valves, said first valve in one position placing said first and second fluid passageway means in communication, third fluid passageway means between said second valve and the first clutch means, fourth fluid passageway means between said second valve and the second clutch means, said second valve in one position placing said second and third fluid passageway means in communication, said second valve in another position placing said second and fourth fluid passageway means in communication, fifth fluid passageway means between said first valve and the fluid circuit of the brakes whereby upon actuation of the brakes fluid in the brake circuit acts on said first valve to shift the latter to a second position for interrupting communication between said first and second fluid passageway means.

2. For use with torque transmitting means including a fluid torque converter, a transmission having an input shaft driven by the torque converter and including first and second fluid actuated clutch means, the combination of control means for controlling actuation of the clutch means and operation of the torque converter comprising, a source of fluid under pressure, a sump tank, fluid passageway means between said source of fluid under pressure and the first and second clutch means, a control valve interposed in said fluid passageway means for selectively placing one of the first or second clutch means in communication with said source of fluid under pressure, a first check valve having a relatively high pressure setting interposed between said fluid passageway means and the torque converter, a second check valve having a relatively low pressure setting interposed between the torque converter and said sump tank for returning fluid passing through the torque converter to said sump tank, and a third check valve having an intermediate pressure setting interposed between the first check valve and said sump tank for by-passing a portion of the fluid flowing through said first check valve around the torque converter.

3. For use with torque transmitting means including a fluid torque converter, a transmission having an input shaft driven by the torque converter and including first and second fluid actuated clutch means, the combination of control means for controlling actuation of the clutch means and operation of the torque converter comprising, a sump tank, a source of fluid under pressure, a first valve, first fluid passageway means between said source of fluid under pressure and said first valve, a second valve, second fluid passageway means between said first and second valves, said first valve in one position placing said first and second fluid passageway means in communication, third fluid passageway means between said second valve and the first clutch means, fourth fluid passageway means between said second valve and the second clutch means, said second valve in one position placing said second and third fluid passageway means in communication, said second valve in another position placing said second and fourth fluid passageway means in communication, said first valve being shiftable to a second position for interrupting communication between said first and second fluid passageway means, a first check valve having a relatively high pressure setting interposed between said first fluid passageway means and the torque converter, a second check valve having a relatively low pressure setting interposed between the torque converter and said sump tank, for returning fluid passing through the torque converter to said sump tank, and a third check valve having an intermediate pressure setting interposed between the torque converter and said sump tank for by-passing a portion of the fluid flowing through said first check valve around the torque converter.

4. For use with torque transmitting means including a fluid torque converter, a transmission having an input shaft driven by the torque converter and including first and second fluid actuated clutch means, the combination of control means for controlling actuation of the clutch means and operation of the torque converter comprising, a sump tank, a source of fluid under pressure, a first valve, first fluid passageway means between said source of fluid under pressure and said first valve, a second valve, second fluid passageway means between said first and second valves, said first valve in one position placing said first and second fluid passageway means in communication, third fluid passageway means between said second valve and the first clutch means, fourth fluid passageway means between said second valve and the second clutch means, said second valve in one position placing said second and passageway 21 is directed to the interior of the pump housing 8. The fluid flowing past the check valve 145 thus has communication with the torque converter 6 through fluid passageway means 167 indicated diagrammatically in Figure 9. As also described hereinbefore, fluid, leaving the turbine elements 11 of the torque converter 6, flows to the check valve 26 through fluid passageway means which is indicated diagrammatically at 168. The fluid flowing past the check valve 26, as shown diagrammatically in Figure 9, is directed through fluid passageway means 169 to a cooler 170 wherefrom the fluid is directed through fluid passageway means 171 to the sump tank 104. Suitable fluid lines (not shown) place the fluid passageway means 171 in communication with the aforenoted fluid passageway ports 56 and 102, formed in the end plates 57 and 100 secured to the transmission housing 34 and transmission cover member 37, where the fluid is directed to the plurality of clutch plates 45 and 49 and 81 and 85 for effecting cooling of the latter. This is shown diagrammatically in Figure 9 wherein suitable fluid passageway means 172 is shown connecting the fluid passageway means 171 with the clutch means 32 and 72.

In addition, should the pressure of the fluid which is directed to the torque converter 6, exceed 40 p. s. i., the fluid would effect opening of the check valve 149 thereby by-passing a portion of the fluid to the sump tank 104 through the fluid port 152. From the above description, it will be apparent that the three check valves 26, 145 and 149 are operatively related to maintain the pressure of the fluid flowing to the torque converter 6 within the proper range for efficient operation of the latter.

The transmission which has been described in detail hereinbefore, has particular utility in an industrial truck with which loads are engaged, transported and deposited. When loads are being raised or lowered by the industrial truck, the prime mover driving the crankshaft 4 must be operated to run the fluid pump provided for developing fluid pressure for actuating the various auxiliary devices of the truck. It also frequently becomes necessary to "inch" the truck forwardly or rearwardly to properly position the same as a load is being engaged and raised or lowered. In order to permit the last noted operations to be efficiently carried out, in the modified embodiment of the control system of my present invention, I provide means for rendering the clutch means 32 and 72 inoperative when the brakes of the vehicle are applied. Thus, the prime mover may be continuously operated during the raising and lowering of a load while simultaneously, drive between the input and the output shafts of the transmission may be interrupted and reestablished quickly and positively to permit "inching" of the vehicle without interfering with the operations of raising and lowering a load.

Figure 10:
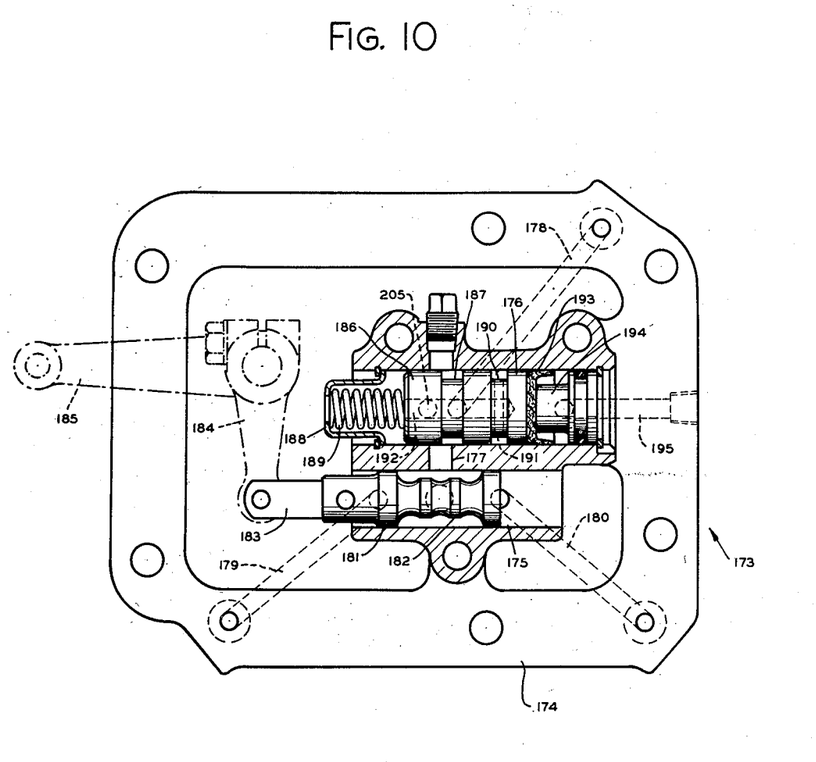
Figure 10 is a sectional view of another embodiment of control valve mechanism of my present invention.

In the modified embodiment of my present invention, I employ a control valve mechanism indicated generally by the reference numeral 173 in Figure 10 which, in the same manner as the aforedescribed valve mechanism 137 is disposed within the transmission housing 104 and suitably secured to the side wall thereof. The control valve mechanism 173 comprises a valve body 174 in which is formed a pair of parallel valve openings 175 and 176. The valve openings 175 and 176 are interconnected by a fluid passageway 177. A fluid passageway 178 is formed in the valve body 174, and communicates, at one end, with the valve opening 176 and, at the other end, opens outwardly of the valve body 174. A pair of fluid passageways 179 and 180 are formed in the valve body 174 which communicate, at their one ends, with the valve opening 175, and, at their other ends, open outwardly of the valve body 174. Disposed within the valve openings 175 is a spool valve 181 which is formed with a central annular groove 182. The valve 181, at one end, has connection through a link 183 with a crank arm 184 associated with an operating lever 185 which is adapted to be disposed in one of three positions for locating the valve 181 in one of three positions.

A spool valve 186 is disposed in the valve opening 176 and is formed with a first annular groove 187. Disposed at one end of the valve opening 176 is a retaining cup 188 which carries a coil spring 189 that abuts one end of the valve 186. A second annular groove 190 is formed in the valve member 186, which groove 190 communicates through a radial port 191 with an axial fluid passageway 192 that opens outwardly of the valve at the left end thereof as viewed in Figure 10. Fluid under pressure, admitted through the fluid passageway 178 to the opening 176 about the annular groove 187, which leaks past the outer periphery of the valve 186, is collected within the annular groove 190 and returned through the port 191 and passageway 192 to the sump tank 104.

A generally cup-shaped washer 193 is disposed at the right end of the valve 186 and normally abuts a closure member 194 secured in the right end of the valve opening 176. A fluid passageway 195 is formed in the valve body 174, and communicates, at one end, with the valve opening 176 intermediate of the closure member 194 and the cup-shaped washer 193, and, at its other end, opens outwardly of the valve body 174.

The fluid passageway 178 is adapted to have connection, through a fluid line (not shown), with the discharge side of the fluid pump 20. The valve opening 176 thus has communication with the pump 20 through fluid passageway means which is indicated diagrammatically in Figure 11 by reference numeral 196. The fluid passageways 179 and 180 are adapted to be connected, respectively, through fluid lines (not shown) with the fluid ports 65 and 94 formed in the transmission cover member 37. Thus, the valve opening 175 is placed in communication with the clutch means 32 and 72 through fluid passageway means which is indicated diagrammatically in Figure 11 by reference numerals 197 and 198.

The valve 181 operates in substantially the same manner as the valve 159 described hereinbefore in connection with the first embodiment of control means of my present invention. That is, when the valve 181 is shifted to the left, from the position shown in Figure 11, the fluid passageway means 197 is placed in communication with the fluid passageway 177 thereby permitting fluid under pressure to flow to the clutch means 32 for actuating the latter. In this position of the valve 181, the clutch means 72, through the fluid passageway means 198, is placed in communication with the sump tank 104. Now, if the valve 181 is shifted to the right, from the position shown in Figure 11, the clutch means 32, through the fluid passageway means 197, is placed in communication with the sump tank 104. With the valve 181 shifted to the right, the clutch means 72, through the fluid passageway means 198, is placed in communication with the source of fluid under pressure and is thus actuated. It is to be observed that the valve 181 is adapted to be disposed in one of three positions, that is, neutral or in a position actuating either clutch means 32 or clutch means 72.

Figure 11:
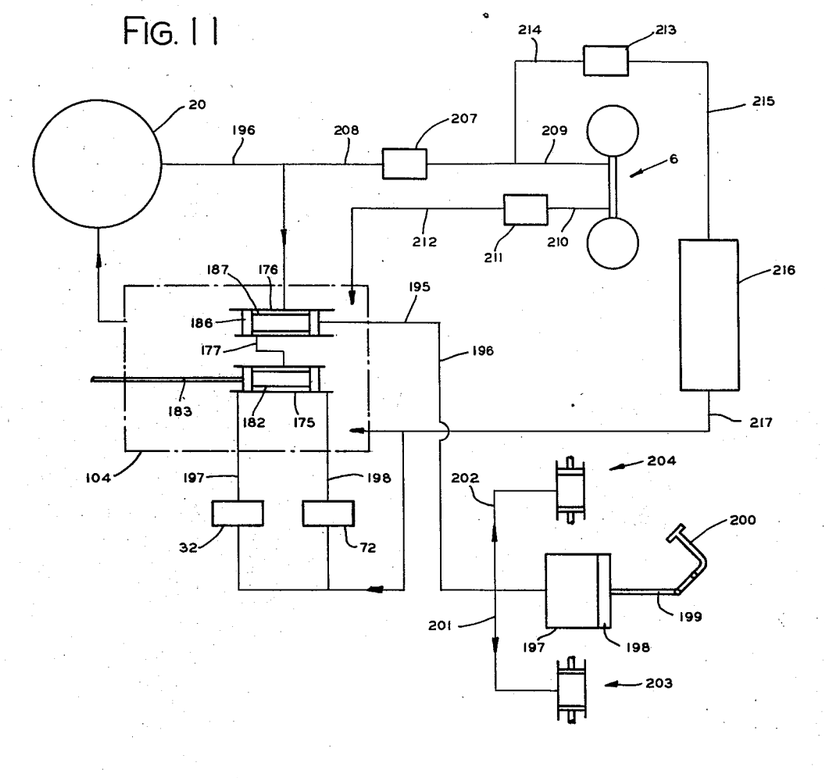
Figure 11 is a diagrammatic showing of another embodiment of fluid control system of my present invention wherein the control valve mechanism of Figure 10 is incorporated.

The aforedescribed fluid passageway 195 communicates, through a fluid line 196, with the master cylinder 197 of the brake system of the vehicle. Disposed in the master cylinder 197 is a piston 198 which is adapted to be moved, through suitable linkage means indicated diagrammatically at 199, by means of a brake pedal 200. Now, when the brake pedal 200 is depressed, fluid in the master cylinder 197 is compressed thereby exerting a force on the fluid in the brake lines 201 and 202 leading to the wheel cylinder assemblies indicated diagrammatically at 203 and 204. As the wheel cylinder assemblies 203 and 204 are actuated for applying the vehicle brakes, a force is also exerted on the fluid in the fluid passageways 195 and 196 which, in turn, exerts a force, within the valve opening 176, on the cup-shaped third fluid passageway means in communication, said second valve in another position placing said second and fourth fluid passageway means in communication, said first valve being shiftable to a second position for interrupting communication between said first and second fluid passageway means, a first check valve having a relatively high pressure setting, fifth fluid passageway means between said first fluid passageway means and said first check valve, sixth fluid passageway means between said first check valve and the fluid torque converter, a second check valve having a relatively low pressure setting, seventh fluid passageway means between said fluid torque converter and said second check valve, eighth fluid passageway means between said second check valve and said sump tank, a third check valve having an intermediate pressure setting, ninth fluid passageway means between said third check valve and said sixth fluid passageway means, a cooler, tenth fluid passageway means between said third check valve and said cooler, and eleventh fluid passageway means between said cooler and said sump tank.

5. The combination of claim 4 including twelfth fluid passageway means between said eleventh fluid passageway means and the first and second clutch means whereby fluid flowing thereto effects cooling of the first and second clutch means.

6. For use in a transmission having first and second fluid actuated clutch means, the combination of control means for selectively controlling actuation of the clutch means comprising, a source of fluid under pressure, a sump tank, a first valve mounted in said sump tank, first fluid passageway means between said source of fluid under pressure and said first valve, a second valve mounted in said sump tank, second fluid passageway means between said first and second valves, said first valve in one position placing said first and second fluid passageway means in communication, third fluid passageway means between said second valve and the first clutch means, fourth fluid passageway means between said second valve and the second clutch means, said second valve in one position placing said third and fourth fluid passageway means in communication with said sump tank, said second valve in a second position placing said second and third fluid passageway means in communication and placing said fourth fluid passageway means and said sump tank in communication, said second valve in a third position placing said second and fourth fluid passageway means in communication and placing said third fluid passageway means and said sump tank in communication, and said first valve being shiftable to a second position for interrupting communication between said first and second fluid passageway means.

7. For use in a vehicle having a transmission with fluid activated clutch means and an hydraulic brake means, the combination comprising, a source of pressurized fluid, conduit means supplying the clutch means with said pressurized fluid for its operation, valve means interposed in said conduit means including first and second control means, manual means for selectively operating said first control means to control passage of said fluid to the clutch means for engaging the clutch when fluid pressure is applied thereto and for disengaging the same when fluid pressure is removed therefrom, and means operable when the vehicle's brakes are applied to condition said second control means to isolate the clutch means when said fluid pressure is being supplied by said first control means thereby to disengage the clutch without disturbing said first control means.

8. For use in a wheeled vehicle having a transmission with fluid activated clutch means and a brake system for arresting movement of the vehicle, the combination comprising, a source of pressurized fluid, conduit means transmitting said pressurized fluid to the clutch means, valve means in said conduit means including manually operable means for selectively controlling the passage of pressurized fluid to the clutch means whereby the clutch means is engaged when fluid pressure is applied thereto and disengaged when fluid pressure is removed therefrom, and means interconnecting said valve means with the vehicle's brake system whereby the latter when operated serves to arrest the vehicle and disengage said clutch means while said manually operable means remains conditioned for applying fluid pressure to the clutch means.

9. For use in a vehicle having a transmission including clutch means and service brake operating means, a hydraulic control system comprising, a source of pressurized fluid, means for actuating the clutch means, conduit means transmitting fluid from said pressurized source to said clutch actuating means, control valve means in said conduit means including first and second piston means, means for selectively conditioning the said first piston means to activate the clutch actuating means by admitting pressurized fluid thereto and to deactivate the clutch actuating means by cutting off the admission of pressurized fluid thereto, and additional means operated by the vehicle's service brake operating means for selectively operating said second piston means to isolate said first piston means from said source of pressurized fluid thereby to deactivate said clutch actuating means while said first piston means remains conditioned for activating the clutch actuating means.

10. In a self-propelled vehicle having fluid pressure operated clutch means for connecting the propelling means of the vehicle to the drive wheels thereof and a brake system for arresting movement of the vehicle, the combination comprising, a source of pressurized fluid, conduit means for transmitting pressurized fluid to the clutch means, first valve means in said conduit means, selective means for operating the said first valve means to engage said clutch means by admitting pressurized fluid thereto and to disengage said clutch means by disrupting the flow of said pressurized fluid, second valve means in said conduit means, and means operating said second valve means in response to manipulation of the vehicle's brake system for interrupting transmission of pressurized fluid in said conduit means and inching the vehicle.

11. In a self-propelled vehicle having fluid pressure operated clutch means for connecting the propelling means of the vehicle to the drive wheels thereof and a brake system for arresting movement thereof, the combination comprising, a source of pressurized fluid, conduit means for transmitting pressurized fluid to the clutch means, first valve means in the said conduit means, selective means for operating the said first valve means to admit pressurized fluid to the clutch for engaging it and to cut off the source of fluid to disengage the same, second valve means in the said conduit means, and means responsive to operation of the brake system for arresting movement of the vehicle to operate the said second valve means to interrupt the connection between said source and the clutch means whereby to disengage the clutch means while the said first valve means remains conditioned for admitting pressurized fluid to the clutch means.

12. In a self-propelled vehicle having a fluid pressure operated clutch for connecting the propelling means of the vehicle to the drive wheels thereof and a brake system including a foot operated brake pedal for arresting movement of the vehicle, the combination comprising, a source of pressurized fluid, a conduit for transmitting pressurized fluid to the clutch, first valve means in the said conduit, selective means for operating the said first valve means to admit pressurized fluid to the clutch for engaging it and to cut off said fluid to the clutch to disengage the same, second valve means in the said conduit, spring means biasing the said second valve means to an open position, and means responsive to operation of the brake pedal for arresting movement of the vehicle to overcome the bias of said spring means and close the said second valve means to interrupt connection between said source and the clutch whereby to disengage the clutch while the said first valve means remains conditioned for admitting pressurized fluid to the clutch.

References Cited in the file of this patent

UNITED STATES PATENTS

| | | |
|---|---|---|
| 1,943,534 | Konlichkov et al. | Jan. 16, 1934 |
| 2,032,504 | Schweering | Mar. 3, 1936 |
| 2,065,980 | Maybach | Dec. 29, 1936 |
| 2,100,810 | Livermore | Nov. 30, 1937 |
| 2,103,540 | Livermore | Dec. 28, 1937 |
| 2,307,619 | Brewer | Jan. 5, 1943 |
| 2,362,568 | Le Tourneau | Nov. 14, 1944 |
| 2,488,540 | Hollingsworth | Nov. 22, 1949 |
| 2,503,928 | Van Voorhis et al. | Apr. 11, 1950 |
| 2,536,549 | Hindmarch | Jan. 2, 1951 |
| 2,536,737 | Gerst | Jan. 2, 1951 |